US009169161B2

(12) United States Patent
Steinberger et al.

(10) Patent No.: US 9,169,161 B2
(45) Date of Patent: Oct. 27, 2015

(54) CERAMIC MATERIAL, METHOD FOR PRODUCING THE CERAMIC MATERIAL, AND RESISTOR COMPONENT COMPRISING THE CERAMIC MATERIAL

(75) Inventors: Bernhard Steinberger, Seiersberg (AT); Werner Kahr, Deutschlandsberg (AT); Jan Ihle, Grambach (AT)

(73) Assignee: EPCOS AG, Munich (DE)

( * ) Notice: Subject to any disclaimer, the term of this patent is extended or adjusted under 35 U.S.C. 154(b) by 740 days.

(21) Appl. No.: 13/499,252

(22) PCT Filed: Oct. 7, 2010

(86) PCT No.: PCT/EP2010/065005
§ 371 (c)(1),
(2), (4) Date: Jun. 6, 2012

(87) PCT Pub. No.: WO2011/045227
PCT Pub. Date: Apr. 21, 2011

(65) Prior Publication Data
US 2012/0241990 A1    Sep. 27, 2012

(30) Foreign Application Priority Data
Oct. 14, 2009   (DE) .................. 10 2009 049 404

(51) Int. Cl.
*B29B 9/16*        (2006.01)
*C04B 35/462*   (2006.01)
(Continued)

(52) U.S. Cl.
CPC .......... *C04B 35/4682* (2013.01); *C04B 35/465* (2013.01); *C04B 35/47* (2013.01);
(Continued)

(58) Field of Classification Search
CPC .. C04B 35/462; C04B 35/465; C04B 35/468; C04B 35/4682; C04B 35/4684; C04B 35/4686; C04B 35/4688; H01C 7/025
USPC ........................................................ 501/139
See application file for complete search history.

(56) References Cited

U.S. PATENT DOCUMENTS 4,483,933 A    11/1984 Kobayashi et al.
6,043,974 A     3/2000 Chen et al.
(Continued)

FOREIGN PATENT DOCUMENTS

DE    26 26 513 A1    12/1977
DE    27 53 766 A1     6/1979
(Continued)

OTHER PUBLICATIONS

Lee, W-H., et al., "Effects of Ceramic Processing Parameters on the Microstructure and Dielectric Properties of $(Ba_{1-x}Ca_x)(Ti_{0.99-y}, Zr_yMn_{0.01})O_3$ Sintered in a Reducing Atmosphere," Journal of Materials Science: Materials in Electronics, vol. 12, pp. 123-130, 2001.
(Continued)

*Primary Examiner* — Karl Group
(74) *Attorney, Agent, or Firm* — Slater & Matsil, L.L.P.

(57) ABSTRACT

A ceramic material has the following composition: $(Ba_{1-x}M''_x)O \cdot z(Ti_{1-y}M'''_y)O_2 \cdot D_d \cdot E_e$. In this composition, $(Ba_{1-x}M''_x)=A$ and $(Ti_{1-y}M'''_y)=B$, where $M''$ stands for at least one element selected from: Mg, Ca, Sr, Pb and mixtures thereof; $M'''$ stands for at least one element selected from: Sn, Zr and mixtures thereof; D stands for at least one element having donor properties; E stands for at least one element having acceptor properties. The following applies for the parameters: $0 \leq x \leq 0.6$; $0 \leq y \leq 0.35$; $0 \leq d \leq 0.02$; $0 \leq e \leq 0.02$; $1 < z$; and the following applies for the molar ratio of B to A: $1 < B/A$. The ceramic material comprises Si only as an impurity.

9 Claims, 1 Drawing Sheet

(51) Int. Cl.
*C04B 35/468* (2006.01)
*C04B 35/465* (2006.01)
*C04B 35/47* (2006.01)
*C04B 35/472* (2006.01)
*C04B 35/49* (2006.01)
*H01C 7/02* (2006.01)

(52) U.S. Cl.
CPC .............. *C04B 35/472* (2013.01); *C04B 35/49* (2013.01); *H01C 7/025* (2013.01); *C04B 2235/3206* (2013.01); *C04B 2235/3208* (2013.01); *C04B 2235/3213* (2013.01); *C04B 2235/3215* (2013.01); *C04B 2235/3225* (2013.01); *C04B 2235/3244* (2013.01); *C04B 2235/3251* (2013.01); *C04B 2235/3263* (2013.01); *C04B 2235/3272* (2013.01); *C04B 2235/3275* (2013.01); *C04B 2235/3279* (2013.01); *C04B 2235/3281* (2013.01); *C04B 2235/3293* (2013.01); *C04B 2235/3294* (2013.01); *C04B 2235/3296* (2013.01); *C04B 2235/656* (2013.01); *C04B 2235/72* (2013.01); *C04B 2235/79* (2013.01)

(56) References Cited

U.S. PATENT DOCUMENTS

| | | | | |
|---|---|---|---|---|
| 7,271,115 | B2 * | 9/2007 | Suzuki | 501/138 |
| 7,273,825 | B2 * | 9/2007 | Muto et al. | 501/138 |
| 7,751,178 | B2 * | 7/2010 | Suzuki | 361/321.4 |
| 8,053,385 | B2 * | 11/2011 | Umeda et al. | 501/139 |
| 8,164,880 | B2 * | 4/2012 | Kang et al. | 361/321.4 |
| 2007/0123413 | A1 * | 5/2007 | Suzuki | 501/138 |
| 2007/0142210 | A1 * | 6/2007 | Muto et al. | 501/138 |
| 2008/0004172 | A1 * | 1/2008 | Kojima et al. | 501/139 |
| 2010/0204034 | A1 * | 8/2010 | Umeda et al. | 501/138 |

FOREIGN PATENT DOCUMENTS

| | | |
|---|---|---|
| EP | 0 974 982 B1 | 5/2006 |
| EP | 2 377 837 A1 | 10/2011 |
| JP | 6191935 A | 7/1994 |
| JP | 869901 A | 3/1996 |
| JP | 2000516190 A | 12/2000 |
| JP | 2002274940 A | 9/2002 |
| JP | 2007299940 A | 11/2007 |
| JP | 2009-173473 A | 8/2009 |
| WO | WO 98/54737 A2 | 12/1998 |

OTHER PUBLICATIONS

Hsiang, H-I., et al., "Microstructure Evolution and Electric Properties with Addition Amounts of Dysprosium ($DyO_{1.5}$) in $(BaCa)(TiZr)O_3$ Ceramics," Materials Science and Engineering B, vol. 123, pp. 69-73, 2005.

Ding, S.W., et al., "Electrical Properties of Y- and Mn-doped $BaTiO_3$-based PTC Ceramics," Ceramics International, vol. 34, pp. 2007-2010, 2008.

* cited by examiner

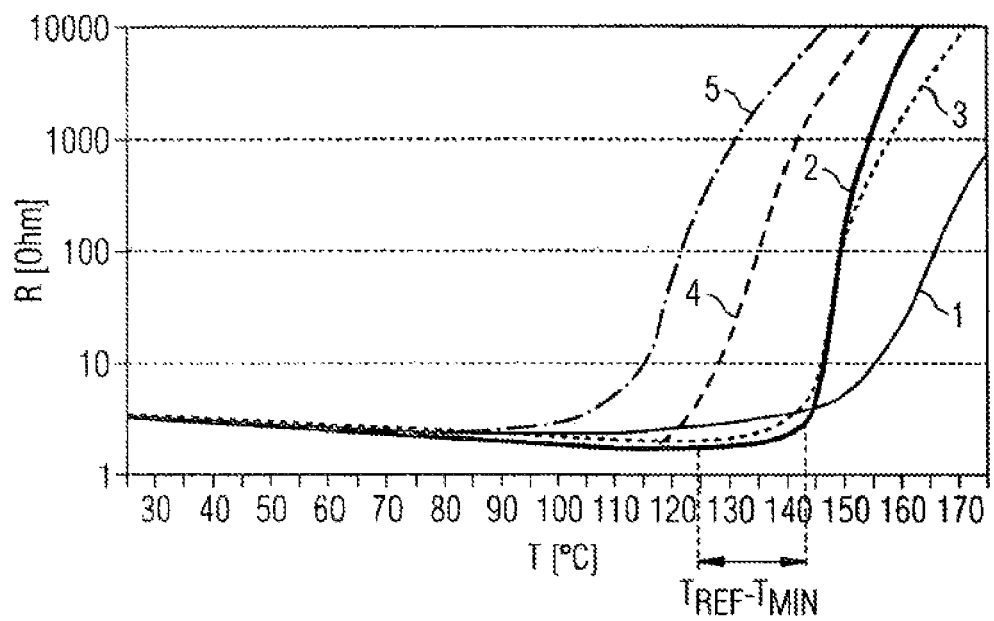

CERAMIC MATERIAL, METHOD FOR PRODUCING THE CERAMIC MATERIAL, AND RESISTOR COMPONENT COMPRISING THE CERAMIC MATERIAL

This application is a national phase filing under section 371 of PCT/EP2010/065005, filed Oct. 7, 2010, which claims the priority of German patent application 10 2009 049 404.9, filed Oct. 14, 2009, each of which is incorporated herein by reference in its entirety.

TECHNICAL FIELD

Embodiments of the invention relate to a ceramic material, a method for producing the ceramic material, and a resistor component comprising the ceramic material.

BACKGROUND

One widespread problem with ceramic materials, which are employed, for example, in PTC components, is the profile of the resistance/temperature characteristic curve while complying with required material parameters. PTC components are temperature-dependent resistor components (thermistors) having a positive temperature coefficient (PTC=positive temperature coefficient). Their resistance increases with increasing temperature.

For heater applications by way of example, for example, auxiliary dielectric heaters of motor vehicles, a high power consumption is required with the lowest possible operating temperature of the individual components, as well as very good control properties of these heating elements. At the same time, the breakdown voltages ($U_D$) and the rated resistance ($R_R$) must correspond to requirements. The breakdown voltage ($U_D$) is the highest voltage which the component can withstand. At a voltage above this value, the component loses its functional property and may possibly be destroyed. The rated resistance ($R_R$) is the resistance value of the unloaded component at a particular rated temperature ($T_R$). The generally conventional rated temperature is 25° C.

For motor start-up applications, for example, in refrigerator compressors, in order to improve the energy efficiency it is desirable to reduce the residual power at the working point while maintaining sufficient switch-on times and switch-on currents. At the same time, however, the high breakdown voltage ($U_D$) and the short cooling times of the component must be preserved for reliable operation. In this way, inter alia, a substantial energy savings can be achieved.

For application for example in the field of overload protection, a control ratio as high as possible between the rated current and the residual current at working points is desired, with the lowest possible operating temperatures. In this way, substantially higher security can be achieved in the event of overload.

For example, in sensor applications for determining temperatures using PTC components, a relatively wide temperature window for the signal temperature is specified on the basis of the characteristic curve shape, which restricts the application of PTC temperatures. A steep rise from the minimum temperature ($T_{MIN}$) to the maximum temperature ($T_{MAX}$) would permit reduction of the temperature window and therefore more precise adjustment of the switching temperature. The minimum temperature ($T_{MIN}$) is in this case the temperature at which the minimum resistance ($R_{MIN}$) is reached. Similarly, the maximum temperature ($T_{MAX}$) is the temperature at which the highest resistance in the measurement range, i.e., the maximum resistance ($R_{MAX}$), is measured.

BRIEF DESCRIPTION OF THE DRAWINGS

Variants of the invention will be explained in more detail below with the aid of a FIGURE and exemplary embodiments.

The lone FIGURE shows the resistance/temperature characteristic curves for five different ceramic materials.

The following list of reference symbols may be used in conjunction with the drawings:

1 characteristic curve of composition 1 not according to the invention
2 characteristic curve of composition 2 according to the invention
3 characteristic curve of composition 3 according to the invention
4 characteristic curve of composition 4 according to the invention
5 characteristic curve of composition 5 according to the invention

DETAILED DESCRIPTION OF ILLUSTRATIVE EMBODIMENTS

In one aspect, the invention provides a ceramic material which has an improved resistance/temperature characteristic curve.

In particular, the characteristic curve profile should have as small as possible temperature difference ($\Delta T$) between the minimum temperature ($T_{MIN}$) and the reference temperature ($T_{REF}$). After the reference temperature ($T_{REF}$), the characteristic curve profile should have a sharp rise in resistance. The breakdown voltage ($U_D$) of the component should not thereby be impaired.

The reference temperature ($T_{REF}$) is the temperature associated with the reference resistance ($R_{REF}$). The reference temperature ($T_{REF}$) is defined as the temperature of the reference resistance ($R_{REF}$) which satisfies: $R_{REF}=2 \times R_{MIN}$, where $R_{MIN}$ stands for the minimum resistance.

In previous approaches, material have been processed by adding liquid phase formers, for example Si, Ge, B, K or Li, to the ceramic material.

In one embodiment of the invention, the ceramic material has the following composition:

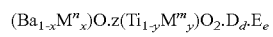

$(Ba_{1-x}M''_x)O.z(Ti_{1-y}M'''_y)O_2.D_d.E_e$ with $(Ba_{1-x}M''_x)=A$ and $(Ti_{1-y}M'''_y)=B$, wherein
$M''$ stands for at least one element selected from: Mg, Ca, Sr, Pb and mixtures thereof;
$M'''$ stands for at least one element selected from: Sn, Zr and mixtures thereof;
D stands for at least one element having donor properties;
E stands for at least one element having acceptor properties;
and the parameters satisfy: $0 \leq x \leq 0.6$; $0 \leq y \leq 0.35$; $0 \leq d \leq 0.02$; $0 \leq e \leq 0.02$; $1 < z$;
and the molar ratio of B to A satisfies: $1 < B/A$, and wherein the ceramic material comprises Si at most as an impurity.

The constituent A is set as 1, or 100 mol %, in relation to 100 mol % of total perovskite material. Because the ratio B/A is greater than 1, the constituent B therefore has a proportion of more than 100 mol %.

In this context, z is preferably greater than 1.002, i.e. $1.002 < z$.

In the context of this invention, "impurities" are intended to mean elements or compounds which are not actively added to the ceramic material, and are not desired therein. They may, for example, be introduced into the ceramic material as impurities of the starting substances or by the production process. The sum of the impurities in the ceramic material is preferably less than 0.05 mol %, particularly preferably less than 0.01 mol %.

The elements for which the symbols D and E stand for are incorporated into the crystal lattice which is formed by the constituents A and B. The elements are respectively present with the corresponding proportion of oxygen for their oxidation number, or as determined by the lattice structure type. The elements therefore may, for example, have been introduced into the lattice as oxides, or alternatively as other salts. The crystal lattice may, in particular, be a perovskite lattice.

The donor properties of D, and the acceptor properties of E, respectively relate to the ability of the corresponding element to give and receive electron density.

Owing to its band gap of 3 eV, undoped $BaTiO_3$ is an insulator having a resistivity of more than $10^{10}$ Ωcm. By partial reduction of the Ti from $Ti^{4+}$ to $Ti^{3+}$, for example, it is possible to achieve so-called n-type conductivity: $Ti^{4+}+e^- \rightarrow Ti^{3+}$. The electrons thereby released are not localized. The reduction may, for example, be carried out by standing in an oxygen-free atmosphere, which leads to oxygen vacancies, or by partial substitution of $Ba^{2+}$ or $Ti^{4+}$ by ions with a higher valency. Doping by ions with a lower valency would not lead to p-type conductivity.

Since valency states of more than 2 for Ba and more than 4 for Ti are not possible, the superordinate electrical neutrality is ensured above all by the creation of oxygen vacancies.

The indices d and e are to be considered in relation to the proportion of A, which is set as 1.

Owing to the excess proportion of Ti, or the incorporation of the elements for which the symbols D and E stand, a significant asymmetry is created between the A-site and B-site elements.

A PTC component which comprises such a ceramic material has a small temperature difference ΔT in its characteristic curve profile between $T_{MIN}$ and $T_{REF}$. The temperature difference ΔT lies, in particular, in the range of 30 K and 5 K. The slope α of the resistance of the PTC component is, in particular, from 35%/K to 130%/K in the temperature range between $T_{REF}$ and $T_{MAX}$. The Inventors have surprisingly found that, in contrast to conventional components which likewise have a steep characteristic curve, such a component has a breakdown voltage $U_D$ which greatly exceeds 130 V/mm.

Components for heating applications, which comprise the ceramic material according to the invention, can therefore achieve a higher power consumption with lower operating temperatures of the individual parts, and a very good control property. At the same time, the breakdown voltage ($U_D$) and the rated resistance ($R_R$) correspond to the necessary requirements.

For motor start-up applications, an improvement of the energy efficiency is achieved by the aforementioned properties of the ceramic material in the PTC component by reducing the residual power at the working point, while maintaining sufficient switch-on times and switch-on currents. In this way, for example, a substantial energy saving can be achieved.

For applications in the field of overload protection, by using the ceramic material according to the invention it is possible to manufacture components which achieve a higher control ratio between the rated current and the residual current at the working point, with substantially lower operating temperatures. In this way, substantially higher security can be ensured in the event of overload.

In sensor applications, for example, for determining temperatures, by using the ceramic material according to the invention it is possible to manufacture PTC components which have an improved characteristic curve shape owing to a narrower temperature window, so that the signal temperature is specified better, which extends the applicability of the ceramic material.

In another embodiment of the invention, the molar ratio of B to A satisfies: 1.005<B/A<1.05. In this context, a molar ratio of 1.005<B/A<1.00105 is preferred.

With these molar ratios of the constituents B and A, it has been possible to achieve a particularly good characteristic curve profile of the resistance/temperature characteristic curve.

In another embodiment of the invention, D stands for at least one element selected from: Nb, Y, Sb or an element from the lanthanide group and mixtures thereof. In this context, Y is preferred.

D may therefore stand for just one of these elements, or for mixtures of several of these elements. The elements mentioned here have good donor properties in connection with the ceramic in question.

In another embodiment of the invention, d satisfies: 0<d.

This means that D, and therefore an element having donor properties, is present in the ceramic material.

In another embodiment of the invention, d satisfies: 0<d<0.01. This corresponds to addition of up to 1 mol % in relation to the A part.

In another embodiment of the invention, E stands for at least one element selected from: Mn, Fe, Ni, Co, Cu and mixtures thereof. In this context, Mn is preferred.

E may therefore stand for precisely one element, or for mixtures of the elements mentioned. The elements mentioned here have good acceptor properties in connection with the ceramic in question.

In another embodiment of the invention, e satisfies: 0<e.

This means that at least one element for which the symbol E stands is present in the ceramic material, and therefore an element which has acceptor properties.

In another embodiment of the invention, e satisfies: 0<e<0.002. This corresponds to addition of up to 0.2 mol % in relation to the A part.

In another embodiment of the invention, e and d satisfy: 0<e and 0<d.

By the interplay of two elements, one of which has good donor properties and the other good acceptor properties, it is possible to obtain a ceramic material which has a good characteristic curve profile for the resistance/temperature characteristic curve, in which, for example, the temperature difference ΔT between $T_{MIN}$ and $T_{REF}$ is small and a steep rise takes place after the reference temperature $T_{REF}$.

In another embodiment of the invention, x satisfies: 0<x. In this context, the range 0.12<x<0.4 is preferred. The range 0.14x<0.4 is particularly preferred.

With this parameter range, it has been possible to achieve particularly good measurement results.

In another embodiment of the invention, y satisfies: y=0.

Even in the absence of M''', it has been possible to achieve very good values for the ceramic material. Even without the substitution of Ti by M''', it has been possible to achieve a very good characteristic curve profile and a very good breakdown voltage $U_D$, as well as a good characteristic curve slope α.

In another embodiment of the invention, y satisfies: 0<y<0.1.

With substitution of the Ti by Sn and/or Zr in this quantity range, it has likewise been possible to achieve very good results.

In another embodiment of the invention, $M''$ at least partially stands for Ca. Preferably, Ca has a minimum content of 10 mol % in A. In this context, a minimum content of 12 mol % is preferred, and 14 mol % is particularly preferred. For the proportion of Ca to $M''$, these correspond to an x of: $x_{Ca} \geq 0.12$ and $x_{Ca} \geq 0.14$, respectively.

The Inventors have found that substituting Ba by Ca leads to particularly good results. The presence of Ca in A makes a substantial contribution to reducing the temperature difference $\Delta T$ between $T_{MIN}$ and $T_{REF}$, and to obtaining a steep rise in the resistance/temperature characteristic curve after $T_{REF}$.

In another embodiment of the invention, the ceramic material comprises the elements B, Ge, Li, K and P at most as impurities.

In the ceramic material according to the invention, it is generally possible to fully obviate the usual liquid phase formers, such as, for example, the elements Si, B, Ge, Li, K and P or their oxides. These elements are present in the ceramic material at most in the form of impurities. These elements, or their oxides, are not generally added actively to the ceramic material.

Besides the ceramic material, a resistor component is also claimed.

In one embodiment of the invention, the resistor component having a positive temperature coefficient comprises a ceramic material as described above.

The advantages obtained for the resistor component are similar to the advantages of the corresponding ceramic material. Owing to the aforementioned properties of the ceramic material, it is highly suitable, for example, for temperature-dependent resistor components.

Besides the ceramic material, a method for producing the ceramic material is also claimed.

In one variant of the method, it comprises the method steps:

A) mixing the starting substances Ba, $M''$, Ti, $M'''$, D and E in the corresponding stoichiometric ratios, so that a mixture is obtained, B) grinding the mixture from A), so that particles are obtained, C) calcining the particles from B), D) wet-grinding the particles from C), so that a slip is formed, E) spray-granulating the slip from D), so that granules are formed, F) pressing the granules from E) into the desired shape, so that a green body is formed, G) sintering the green body from F), so that a ceramic body is obtained.

As starting materials in method step A), it is in this case possible to use, for example, oxides, oxide-forming compounds (i.e., compounds which are converted at least partially into oxides in particular under the conditions of the sintering process according to the invention) and other salts, which are suitable as starting material for the production of the ceramic material according to the invention.

When pressing the granules in method step F), a dry pressing technique may, for example, be employed.

In another variant of the method, it comprises contacting of the ceramic body from G) as an additional method step H).

By the described method, for example, a resistor component having a positive temperature coefficient can be manufactured.

The invention will be explained in more detail below with the aid of an exemplary embodiment.

In order to produce a resistor component having a positive temperature coefficient, the following substances are weighed in: $BaCO_3$ at 80 mol %, $CaCO_3$ at 15 mol %, $PbO_{1.33}$ at 5 mol %, $TiO_2$ at 101 mol %, $YO_{1.5}$ at 0.4 mol %, $MnO_{1.5}$ at 0.08 mol %, in relation to the A part which corresponds to 100 mol %. This ceramic material is a perovskite material. The starting substances are provided in oxide form or in a form which delivers the oxide form, or a form which gives rise to the titanates. This is followed by a wet or dry grinding process with subsequent calcination. After the calcining, the material is wet-ground once more to the desired particle size and subsequently pressed into the desired shape.

A binder may be added to the slip. In this exemplary embodiment, the binder is polyvinyl alcohol. Spray drying to form pressable granules is subsequently carried out here. Shaping to form the green body is then carried out by means of dry pressing.

In this exemplary embodiment, the particles were pressed to form a green body with dimensions of 34 mm×7.3 mm×1.3 mm. The green body obtained in this way is subsequently sintered in a sintering process with a maximum temperature of 1370° C. This results in a monolithic ceramic body. Contacting of the ceramic body with a non-noble metal is subsequently carried out, in this case with a multilayer electrode consisting of Cr, Ni and Ag. The resistor component obtained in this way has a breakdown voltage of 170 V/mm.

The lone figure shows the resistance/temperature characteristic curves (1-5) for the respective ceramic materials 1 to 5. The resistance R in ohms is respectively plotted against the temperature T in degrees Celsius (° C.). The composition of the individual ceramic materials 1 to 5 is given in the following table:

|   | $BaCO_3$ | $CaCO_3$ | $SrCO_3$ | $PBo_{0.75}$ | $TIo_2$ | $Yo_{1.5}$ | $MnO_{1.5}$ | $SiO_2$ | $T_{Sint.}$ [° C.] |
|---|---|---|---|---|---|---|---|---|---|
| 1* | 74 | 10.3 | 4.4 | 11.3 | 100.6 | 0.4 | 0.05 | 2 | 1350 |
| 2 | 80 | 15 | 0 | 5 | 101 | 0.4 | 0.08 | 0 | 1370 |
| 3 | 80 | 15 | 0 | 5 | 101 | 0.4 | 0.08 | 0 | 1360 |
| 4 | 85 | 15 | 0 | 0 | 101 | 0.4 | 0.08 | 0 | 1370 |
| 5 | 80.5 | 15 | 4.5 | 0 | 101 | 0.4 | 0.08 | 0 | 1370 |

*composition not according to the invention

The table indicates the respective element weigh-ins in mol % of the individual starting substances for the respective composition. These correspond to the proportion of the corresponding metal in mol % in the ceramic material. The proportion of the A component, i.e., in these exemplary embodiments the sum of $BaCO_3$, $CaCO_3$, $SrCO_3$ and $PbO_{0.75}$, corresponds to 100 mol %. The values listed in the subsequent columns are to be interpreted relative to this. The respective sintering temperature in ° C. is indicated in the final column.

The characteristic curves were respectively determined for the corresponding PTC components, in which the ceramic material has dimensions of 28.8 mm×6.2 mm, and an electrode spacing of 1.1 mm, which corresponds to the component thickness. Ceramic materials 2 to 5 are ceramic materials according to the invention, while ceramic material 1 is a conventional ceramic material not according to the invention. As can be seen in the lone FIGURE, ceramic materials 2 to 5 have a significantly more rapid and steeper rise after the temperature minimum $T_{MIN}$ than the characteristic curve for ceramic material 1 not according to the invention. Consequently, ceramic materials 2 to 5 have a much smaller temperature difference $\Delta T$ between $T_{REF}$ and $T_{MIN}$. This temperature difference $\Delta T$ ($T_{REF}-T_{MIN}$) is indicated for the characteristic curve of ceramic material 2 in the lone FIGURE. Ceramic materials 2 to 5 according to the invention therefore each have a characteristic curve which has both a smaller $\Delta T$ and a greater characteristic curve slope $\alpha$. In both regards, they contrast significantly with the characteristic curve of ceramic material 1 not according to the invention. The characteristic curves of ceramic materials 2 and 3 both have a reference temperature $T_{REF}$ of 143° C., the characteristic curve of ceramic material 4 has one of 122° C. and the characteristic curve of ceramic material 5 has one of 105° C.

The production of ceramic materials 2 to 5 according to the invention may, for example, be carried out according to the exemplary embodiment described above.

The invention is not limited by the description with the aid of the exemplary embodiments. Rather, the invention covers any new feature and any combination of features, which includes in particular any combination of features in the patent claims, even if these features or this combination are/is not explicitly indicated per se in the patent claims or exemplary embodiments.

The invention claimed is:

1. A resistor component comprising a ceramic material having the following composition:

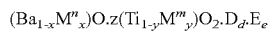

with $(Ba_{1-x}M''_x)=A$ and $(Ti_{1-y}M'''_y)=B$, wherein $M''$ stands for at least one element selected from the group consisting of Mg, Ca, Sr, and Pb and mixtures thereof;

$M'''$ stands for at least one element selected from the group consisting of Sn and Zr and mixtures thereof;

D stands for at least one element selected from: Nb, Y, Sb or an element from the lanthanide group and mixtures thereof;

E stands for at least one element selected from: Mn, Fe, Ni, Co, Cu and mixtures thereof;

wherein the parameters satisfy: $0 \leq x \leq 0.6$; $0 \leq y \leq 0.35$; $0 \leq d \leq 0.02$; $0 \leq e \leq 0.02$; $1<z$; and a molar ratio of B to A satisfies: $1<B/A$, and wherein the ceramic material comprises at most 0.05 mol% Si, wherein $M''$ at least partially stands for Ca, and Ca has a minimum content of 10 mol% in A, and wherein the resistor component comprising the ceramic material has a positive temperature coefficient.

2. The resistor component according to claim 1, wherein the molar ratio of B to A satisfies: $1.005<B/A<1.05$.

3. The resistor component according to claim 1, wherein d satisfies:
$0<d$.

4. The resistor component according to claim 1, wherein e satisfies:
$0<e$.

5. The resistor component according to claim 1, wherein x satisfies:
$0.12<x<0.4$.

6. The resistor component according to claim 1, wherein y satisfies:
$0=y$.

7. The resistor component according to claim 1, wherein y satisfies:
$0<y<0.1$.

8. The resistor component according to claim 1, wherein $M''$ at least partially stands for Ca, and Ca has a minimum content of 12 mol% in A.

9. The resistor component according to claim 1, wherein the ceramic material comprises the elements B, Ge, Li, K and P at most as impurities.

* * * * *